US012273898B2

United States Patent
Sun et al.

(10) Patent No.: US 12,273,898 B2
(45) Date of Patent: Apr. 8, 2025

(54) ENHANCED DYNAMIC SPECTRUM SHARING (DSS) IN CELL GROUPS

(71) Applicant: Apple Inc., Cupertino, CA (US)

(72) Inventors: Haitong Sun, Cupertino, CA (US); Dawei Zhang, Saratoga, CA (US); Wei Zeng, Saratoga, CA (US); Yushu Zhang, Beijing (CN); Hong He, San Jose, CA (US); Chunxuan Ye, San Diego, CA (US); Huaning Niu, San Jose, CA (US); Jie Cui, San Jose, CA (US); Wei Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/765,478

(22) PCT Filed: Apr. 5, 2021

(86) PCT No.: PCT/CN2021/085505
§ 371 (c)(1),
(2) Date: Mar. 31, 2022

(87) PCT Pub. No.: WO2022/213231
PCT Pub. Date: Oct. 13, 2022

(65) Prior Publication Data
US 2024/0057107 A1    Feb. 15, 2024

(51) Int. Cl.
*H04W 72/232* (2023.01)
*H04W 72/12* (2023.01)

(52) U.S. Cl.
CPC ......... *H04W 72/232* (2023.01); *H04W 72/12* (2013.01)

(58) Field of Classification Search
CPC ... H04W 72/232; H04W 72/12; H04W 72/23; H04L 5/001; H04L 5/0053
See application file for complete search history.

(56) References Cited

U.S. PATENT DOCUMENTS

2019/0297604 A1    9/2019  Lee et al.
2021/0203468 A1*   7/2021  Yi ................. H04W 72/0453
(Continued)

OTHER PUBLICATIONS

PCT Search Report dated Dec. 20, 2021 in connection with PCT Application No. PCT/CN2021/085505.
(Continued)

*Primary Examiner* — Edan Orgad
*Assistant Examiner* — Malick A Sohrab
(74) *Attorney, Agent, or Firm* — Eschweiler & Potashnik, LLC; Matthew W Glause

(57) ABSTRACT

Techniques described herein may include a special scheduling cell (sSCell) provided for dynamic spectrum sharing (DSS). The sSCell may schedule a primary cell of a master cell group (MCG) or a primary cell of a secondary cell group (SCG). The primary cell may be referred to as a special cell or SpCell. The sSCell may be activated and/or deactivated, enter in or exit from a state of dormancy, and radio link monitoring (RLM), beam failure recovery (BFR), and cell grouping parameters may be provided. Techniques described herein include configuring a UE-specific search space (USS) with non-fallback downlink control information (DCI), USS with fallback DCI, and overall search space for DSS enhancement.

20 Claims, 13 Drawing Sheets

(56) References Cited

U.S. PATENT DOCUMENTS

| | | | |
|---|---|---|---|
| 2022/0046662 A1* | 2/2022 | Takeda | H04W 24/08 |
| 2022/0046683 A1* | 2/2022 | Takeda | H04W 72/1273 |
| 2022/0052749 A1* | 2/2022 | Guo | H04W 76/19 |
| 2022/0294581 A1* | 9/2022 | Babaei | H04L 5/0094 |
| 2022/0303880 A1* | 9/2022 | Takeda | H04W 48/16 |
| 2022/0353710 A1* | 11/2022 | Yoshioka | H04W 72/1273 |
| 2023/0156597 A1* | 5/2023 | Liu | H04L 5/0098 |
| | | | 370/311 |
| 2023/0254857 A1* | 8/2023 | Moon | H04B 17/24 |
| | | | 370/329 |

OTHER PUBLICATIONS

PCT Written Opinion dated Dec. 31, 2021 in connection with PCT Application No. PCT/CN2021/085505.
ETRI Cross-carrier scheduling from SCell to PCell; 3GPP TSG RAN WG1; #103-e; R1-2009023; Nov. 13, 2020 (Nov. 13, 2020).

* cited by examiner

ENHANCED DYNAMIC SPECTRUM SHARING (DSS) IN CELL GROUPS

This application is a National Phase entry application of International Patent Application No. PCT/CN2021/085505 filed Apr. 5, 2021, entitled "ENHANCED DYNAMIC SPECTRUM SHARING (DSS) IN CELL GROUPS", the contents of which are herein incorporated by reference in their entirety.

FIELD

This disclosure relates to wireless communication networks, including techniques for wireless spectrum sharing in cell groups of a wireless communication network.

BACKGROUND

As the number of mobile devices within wireless networks, and the demand for mobile data traffic, continue to increase, changes are made to system requirements and architectures to better address current and anticipated demands. For example, some wireless communication networks may be developed to implement fifth generation (5G) or new radio (NR) technology, sixth generation (6G) technology, and so on. An aspect of such technology includes addressing how wireless devices wireless resources may be allocated to communications between user equipment (UEs) and base stations (which may include one or more cells).

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

Figure 1:
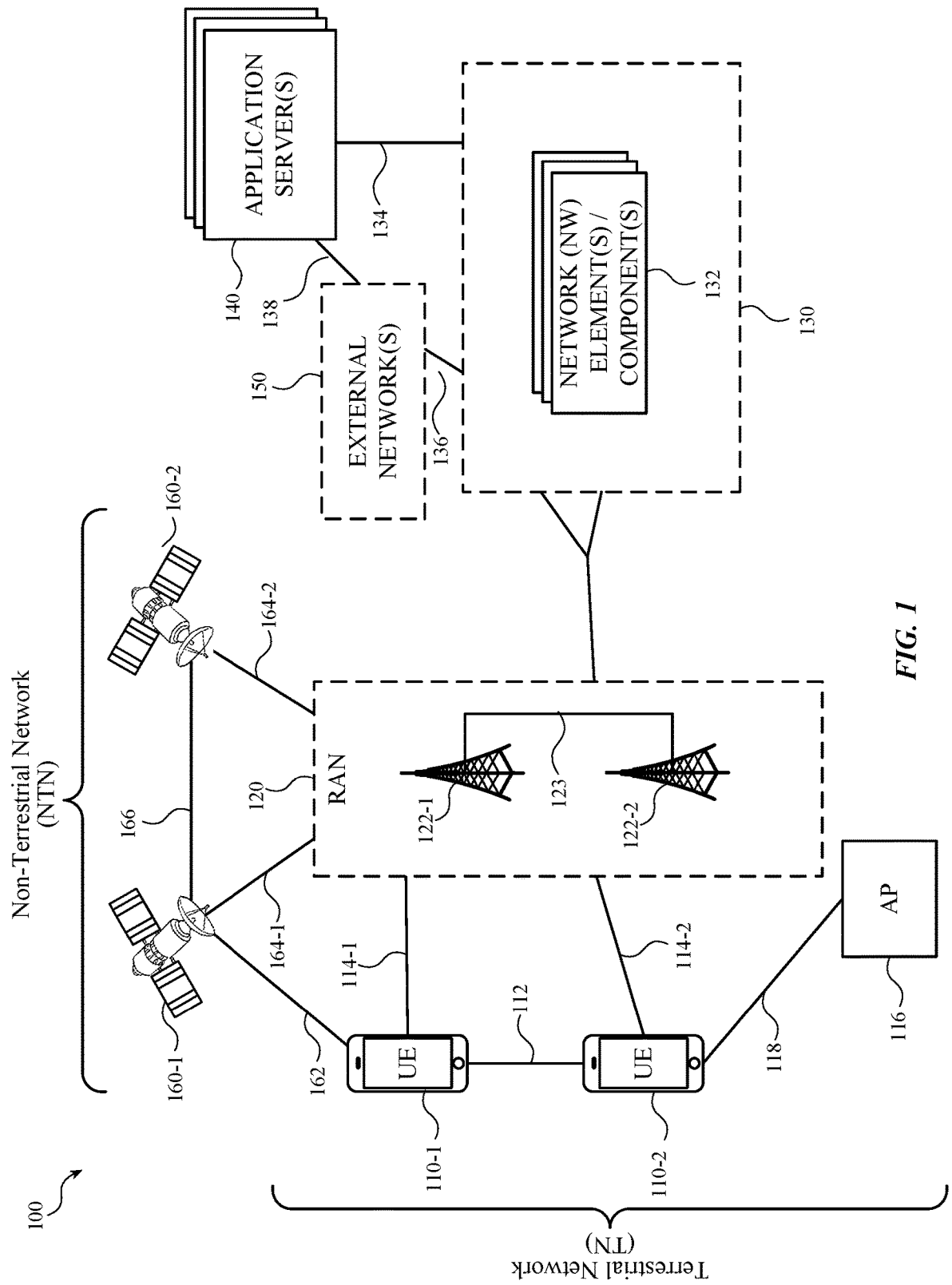
FIG. 1 is a diagram of an example network according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Mobile communication networks may include one or more types and/or generations of wireless communication networks, such as 4th generation (4G) (e.g., Long-Term Evolution (LTE)) networks, 5th generation (5G) or new radio (NR) networks, etc. Such networks may include user equipment (UEs) and base stations that communicate with one another wirelessly. In some implementations, a network may simultaneously implement more than one type of network technology (e.g., 4G and 5G) such that UEs may operate within the network based on 4G technology or 5G technology. An aspect of such networks may include dynamic spectrum sharing (DSS). DSS may include a technique whereby similar features of wireless communication (e.g., subcarrier spacing, time domain structures, etc.), may be used for both 4G or 5G technology, such that UEs and base stations are able to communicate with one another in the same network and via the same radio spectrum(s). However, while currently available DSS techniques may enable both 4G and 5G technologies to be implemented simultaneously (e.g., using the same network and radio spectrum), current DSS techniques include certain limitations.

For example, current DSS techniques may limit 5G implementations due to certain 4G constructions and implementations. In one example, current DSS techniques (e.g., 4G or LTE techniques) may limit 5G due to cell reference signal (CRS) transmissions from LTE. For example, in LTE, when 1 or 2 port CRS is implemented, the CRS may occupy symbols 0, 4, 7, and 11, and when 4 port CRS is implemented, the CRS may occupy symbols 0, 1, 4, 7, 8, and 11. As such, current DSS techniques may forego benefits, efficiencies, and flexibilities enabled by 5G technology, which limits the number of symbols, the frequency and time location for 5G control resource set (e.g., CORESET) configurations.

Additionally, current 4G or LTE techniques may limit 5G implementations in terms of cross carrier scheduling (CCS) (e.g., no scheduling between different groups of cells, a primary cell only being scheduled by itself, each scheduled cell only having one scheduling cell configurable via radio resource control (RRC) messaging, etc.). Current 4G or LTE techniques may further limit 5G implementations in terms of downlink control information (DCI). For example, 4G or LTE techniques may limit 5G DCI to certain DCI formats (e.g., DCI formats 0_0, 1_0, etc., of LTE for fallback DCI. Similarly, current 4G or LTE techniques may impose certain search space restriction, such as common search space (CSS) restrictions for fallback DCI. Current 4G or LTE techniques may further limit 5G implementations in terms of cell grouping, cell scheduling, cell activation and deactivation, cell dormancy and wakeup, etc. For example, current 4G or LTE techniques may not provide for adequate cell activation and deactivation, cell dormancy and wakeup, etc.

Techniques described herein may include solutions to the aforementioned limitations. In some implementations, a special scheduling cell (sSCell) may be provided for DSS. The sSCell may be configured to schedule a primary cell of a master cell group (MCG) or a primary cell of a secondary cell group (SCG). Such a primary cell may be referred to herein as a special cell or SpCell. In some implementations, the sSCell may be activated and/or deactivated, enter in or exit from a state of dormancy, and radio link monitoring (RLM), beam failure recovery (BFR), and cell grouping parameters may be provided. Techniques described herein may include solutions for configuring a UE-specific search spaces (USS) with non-fallback DCI, USS with fallback DCI, and overall search space for DSS enhancement.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with (e.g., be communicatively coupled with) RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 122.

As shown, UE 110 may also, or alternatively, connect to access point (AP) 116 via interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable the connections 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 120 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 120 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle radio resource control (RRC) and non-access stratum (NAS) related activities. The other serving cells are referred to as SCells, and each SCell may provide an individual secondary component carrier (SCC)

for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system 100 is an LTE system, interface 123 may be an X2 interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers (as) 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application server 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2).

Additionally, or alternatively, satellite 160 may include a GEO satellite, LEO satellite, or another type of satellite. Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160).

Figure 2:
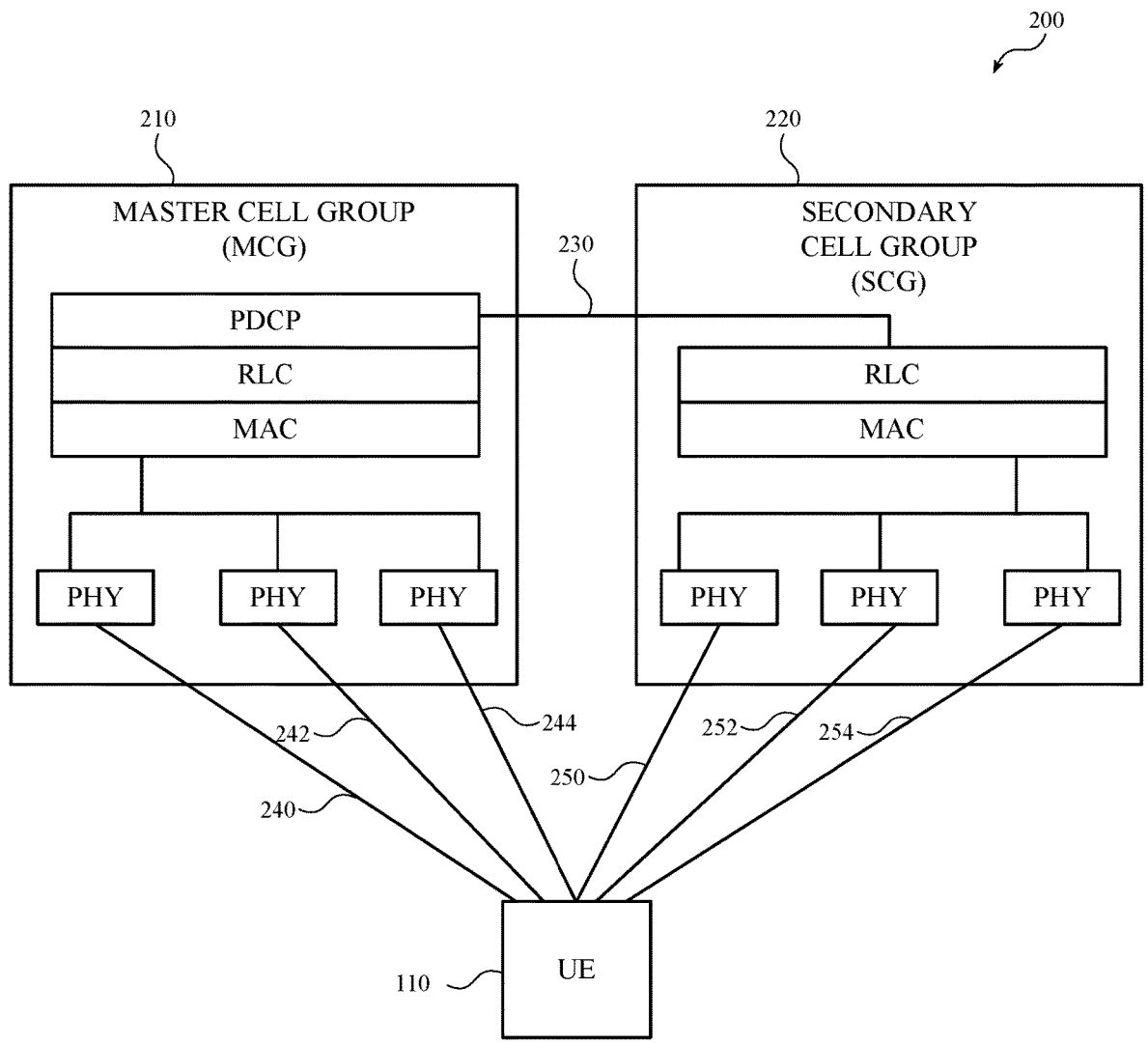
FIG. 2 is a diagram of a master cell group (MCG) and a secondary cell group (SCG) of a wireless communication network.

FIG. 2 is a diagram of an example 200 of a master cell group (MCG) 210 and a secondary cell group (SCG) 220 of a wireless communication network. An MCG may include a group of cells associated with a master node, comprising a primary cell (PCell) and one or more secondary cells (SCells). An SCG may include a group of serving cells associated with a secondary node, comprising a primary cell of the secondary cell group (PSCell) and optionally one or more secondary cells (SCells).

MCG 210 may be implemented by one or more base stations and may include one or more layers. Examples of such layers may include a packet data convergence protocol (PDCP) layer, a radio link control (RLC) layer, a media access control (MAC) layer, and multiple physical (PHY) layers. Each PHY layer may correspond to a different implementation of a cell with respect to UE 110. Additionally, or alternatively, the PHY layers may operate in combination (e.g., be managed, controlled by, etc.) the PDCP, layer RL:C, layer, and MAC layers. In some implementations, one PHY layer 240 may operate as a primary cell (PCell) or a special cell (SpCell) and other PHY layers 242 and 244 may operate to secondary cells (SCells) to the PCell.

SCG 220 may include multiple layers as well, including an RLC layer, a MAC layer, and multiple PHY layers. SCG 220 may not include a PDCP layer, but instead may rely on the PDCP layer of MCG 210 via connection 230. Similar to the PHY layers of MCG 210, the PHY layers of SCG 220 may each function or operate as a cell with respect to UE 110. In some implementations, one PHY layer 250 may operate as a primary cell (PCell) to PHY layers 252 and 254 operating as secondary cells to the PCell of PHY layer 250. As such, a special cell (SpCell) as described herein, may include a PCell of MCG 210 or a PCell of SCG 220. A scheduling secondary cell (sSCell), as described herein, may include a secondary cell (SCell) to any SpCell, which may each reside in the same cell group or different cell groups. Further, while FIG. 2 includes only 2 cell groups, implementation discussed herein may be applied to multiple cell groups operating in synchronization or collaboration with one another to perform the techniques described herein. Furthermore, each cell group (e.g., MCG and/or SCG) may be implemented on one or more base station, and a cell group operating as either an MCG or SCG may change, and cells within a cell group (e.g., a SpCell, SCell, sSCell, etc.) may be changed by activation, deactivation, dormancy, etc.

MCG 210 and SCG 220 may be involved in a dual connectivity scenario with UE 110, in which case a random access channel (RACH) procedure, and the like, may be directed to MCG 210. Additionally, MCG 210 and SCG 220 may each include a PCell (e.g., 240 and 250), and a PCell may be referred to herein as a special cell or special primary cell, represented as SpCell. Further, a secondary cell (SCell) of either MCG 210 or SCG 220 may operate as a scheduling secondary cell (sSCell) configured to provide configuration, scheduling, activation, deactivation, and other functions or commands toward a SpCell of either MCG 210 or SCG 220. As such, a base station, a baseband processor of a base station, etc., may include a base station of MCG 210 and/or SCG 220 controlling, managing, enabling, etc., a sSCell, of either MCG 210 and/or SCG 220, and/or a SpCell of either MCG 210 and/or SCG 220, which may include additional SCells or SpCells within either MCG 210 and/or SCG 220.

Figure 3:
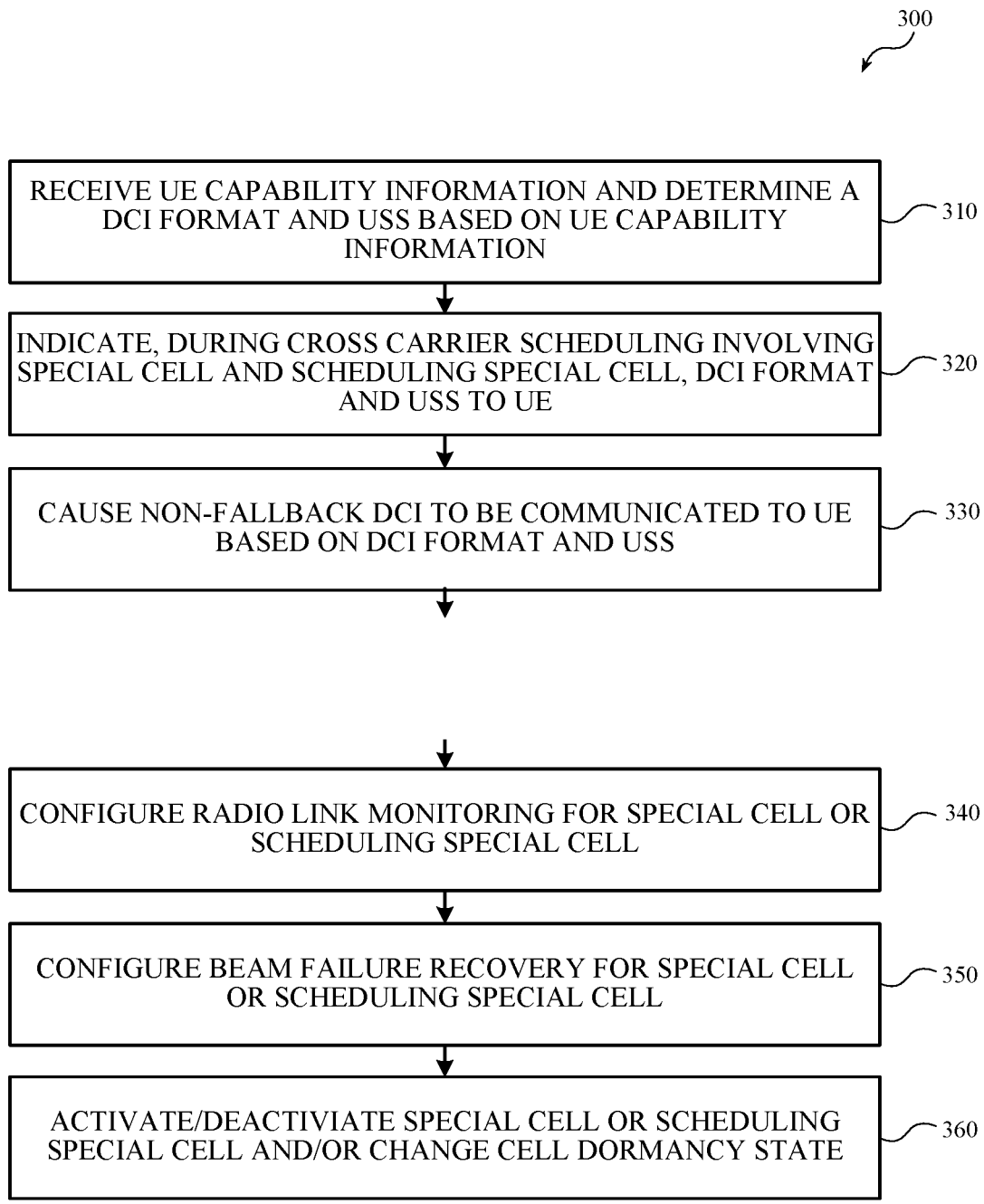
FIG. 3 is a flowchart of an example process for managing dynamic spectrum sharing (DSS) in one or more cell groups.

FIG. 3 is a flowchart of an example process 300 for managing dynamic spectrum sharing (DSS) in one or more cell groups. Process 300 may be implemented by a base station comprising an SpCell and/or sSCell (e.g., of either MCG 210 or SCG 220). For example, process 300 may be implemented by an sSCell implemented by a base station (which may be an example of RAN 120, described above with reference to FIG. 1). In some implementations, some or all of process 300 may be performed by one or more other systems or devices, including one or more of the devices of FIG. 1. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3.

As shown, process 300 may include receiving capability information and determining a DCI format and USS based on the capability information (block 310). For example, a base station may receive UE capability information, from UE 110. The capability information may indicate whether UE 110 is capable of receiving non-fallback DCI during a USS in either SpCell or sSCell. In some implementations, the UE capability information may also, or alternatively, indicate whether UE 110 is capable of receiving fallback DCI in either SpCell or sSCell. Additionally, or alternatively, the base station may determine, based on the capability information, a DCI format and USS for communicating with UE 110. In some implementations, the capacity information may inform the base station, which cells (e.g., SpCell and/or sSCell may be scheduled to send non-fallback DCI during a USS of UE 110. As such, as described herein, the capacity information may enable, cause, etc., the base station to determine, identify, configure, etc., cells for communicating the non-fallback DCI during a USS of UE 110.

Process 300 may also include indicating, during CCS involving SpCell and sSCell, the DCI format and USS to UE 110 (block 320). For example, the base station may engage in CCS procedure involving SpCell and sSCell, which may also involve communications to UE 110. In some implementations, as part of the CCS procedure, the base station may indicate the DCI format and/or USS to UE 110. In some implementations, this may enable UE 110 to monitor an appropriate search space (e.g., the USS) in accordance with the DCI format used by the base station to communicate with UE 110.

Process 300 may include causing non-fallback DCI to be communicated to UE 110 based on the DCI format and USS (block 330). For example, the base station may cause no-fallback DCI to be communicated to UE 110. In doing so, the base station may be operating as a SpCell and/or sSCell. The non-fallback DCI may be communicated in a manner consistent with the USS, such that UE 110 may be monitoring the USS when the non-fallback DCI is communicated. As described herein, the non-fallback DCI may enable UE 110 to communicate with the base station (e.g., SpCell and sSCell) in accordance with DCI or fallback DCI that might otherwise be used for enabling communication between UE 110 and the base station.

Process 300 may include configuring radio link monitoring (RLM) for a SpCell and/or sSCell (block 340). Radio Link Monitoring (RLM) may include a procedure to monitor a quality level of a radio link, such as a physical downlink control channel (PDCCH) transmission in new radio (NR). In some implementations, the base station may configure RLM for a SpCell and/or sSCell. For example, the base station may cause an RRC message to be communicated to the SpCell, sSCell, and/or UE 110, which may indicate whether a reference signal for RLM (e.g., a RadioLinkMonitoringRS element) is associated with the SpCell and/or the sSCell. In some implementations, this may be indicated by a particular RRC field or value, such as a ServCellIndex field or value.

In some implementations, when RLM reference signal (e.g., a RadioLinkMonitoringRS element) is not configured, UE 110 may use a reference signal provided for a transmission configuration indicator state for PDCCH reception in the SpCell and/or sSCell. Additionally, when UE 110 uses the RS provided for the active TCI state for PDCCH reception in both SpCell and sSCell, if a total number of reference signals exceeds a reference signal capacity or threshold of UE 110, UE 110 may select a reference signal based on a pre-determined reference signal priority. In some implementations, UE 110 may first select the PDCCH of the SpCell instead of the sSCell. Additionally, or alternatively, UE 110 may select search space sets in an order from a shortest monitoring periodicity, and if more than one CORESETs are associated with search space sets having the same monitoring periodicity, UE 110 may determine an order of the CORESET from a highest CORESET index, which may, e.g., be indicated to UE 110 by the base station during the CCS procedure, via an RRC message, etc.

Process 300 may include configuring beam failure recovery (BFR) for a SpCell and/or sSCell (block 350). For example, a base station may configure UE to monitor reference signals for BFR from sSCell instead of, or in addition to, for example, the reference signals from SpCell. In some implementations, BFR may be configured using a BeamFailureRecoverySCellConfig IE of the SCell. In some implementations, BFR may be based on a list or configuration of candidate beams or reference signals of the SpCell and/or the sSCell, which may include an index (e.g., a ServCellIndex) introduced in a particular IE, such as a PRACH-ResourceDedicatedBFR configuration IE. In some implementations, BFR may be based on one or more recovery spaces of BFRPs (Beam Failure Request resPonse) and/or recoverySearchSpaceIds for the SpCell, the sSCell, or both the SpCell and sSCell.

Process 300 may include activating and/or deactivating the SpCell and/or sSCell (block 360). For example, at some point, a base station may communicate an indication (e.g., a MAC CE) from of a change (e.g., activation or deactivation) of the SpCell and/or sSCell, and UE 110 may change the UE monitoring for DCI. For example, when sSCell is deactivated, UE 110 may switch from monitoring a USS of the sSCell to monitoring a USS of the SpCell. Similarly, the base station may cause the sSCell to enter a state of dormancy or transition back to an awake state. When USS with non-fallback DCI is configured both in sSCell and SpCell, if the sSCell is dormant, UE 110 may monitor USS with non-fallback DCI the on SpCell. Additionally, or alternatively, if the sSCell is woken up, UE 110 may monitor USS with non-fallback DCI configured on the sSCell, not configured on SpCell (if, for example, UE 110 does not support simultaneous SpCell and sSCell non-fallback DCI monitoring). Depending on the implementations, the at least on SpCell, optionally on sSCell DCI that can trigger SCell dormancy can be configured: only on SpCell, not on sSCell; either on SpCell or sSCell, but not both; or either on SpCell or sSCell or both. Additionally, or alternatively, DCI Format 2_6, DL DCI Format 1_1, UL DCI Format 0_1 may be used to enforce any one or combination of the configurations.

Figure 4:
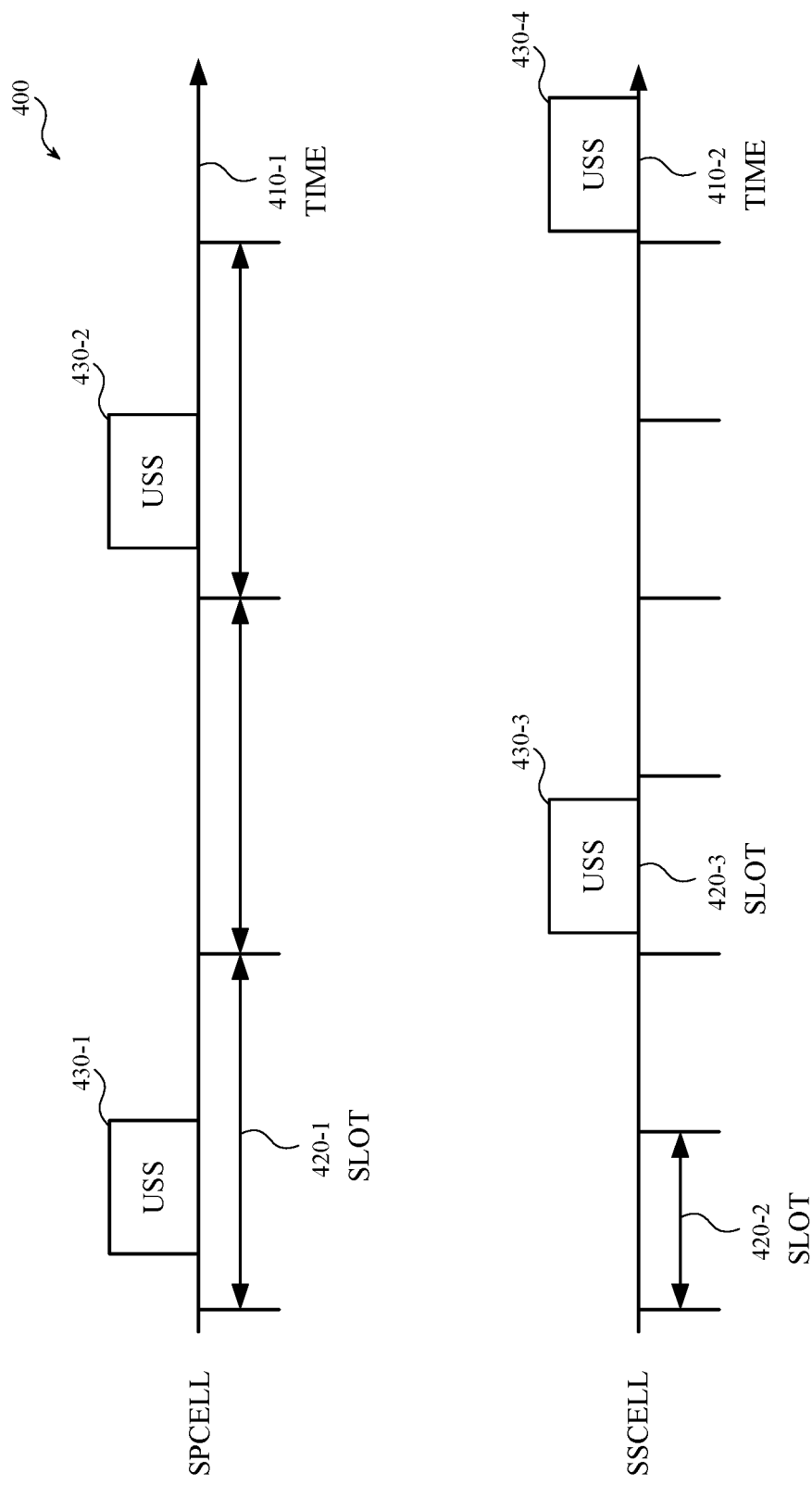
FIGS. 4-5 are diagrams of example slots for a special primary cell (SpCell) and a special scheduling cell (sSCell) along a timeline.

FIG. 4 is a diagram of an example 400 of slots for an SpCell and sSCell. As shown, timeline 410-1 of SpCell may include slots 420-1 with corresponding USS 430-1, 430-2, etc. Similarly, timeline 410-2 of sSCell may include slots 420-2, 420-3, etc., with corresponding USS 430-3, 430-4, etc. In some implementations, when CCS from sSCell to SpCell is configured, and UE 110 is configured to monitor USS with non-fallback DCI on both SpCell and sSCell, a base station (or other type of network device) may configure search spaces to ensure that in each slot. UE 110 is configured to monitor USS with non-fallback DCI on at most one of the SpCell or sSCell. Additionally, or alternatively, when the SpCell and sSCell have different subcarrier spacing (SCS), the base station or other type of network device may configure a duration of a monitoring occasion (e.g., a slot with a USS) to determine a slot overlapping between slots of the SpCell and sSCell. Additionally, or alternatively, when the SpCell and sSCell have different subcarrier spacing (SCS), the base station or other type of network device may determine slot overlapping based on which slot (e.g., between slots of the SpCell and sSCell) contains the monitoring occasion (e.g., the USS).

Figure 5:
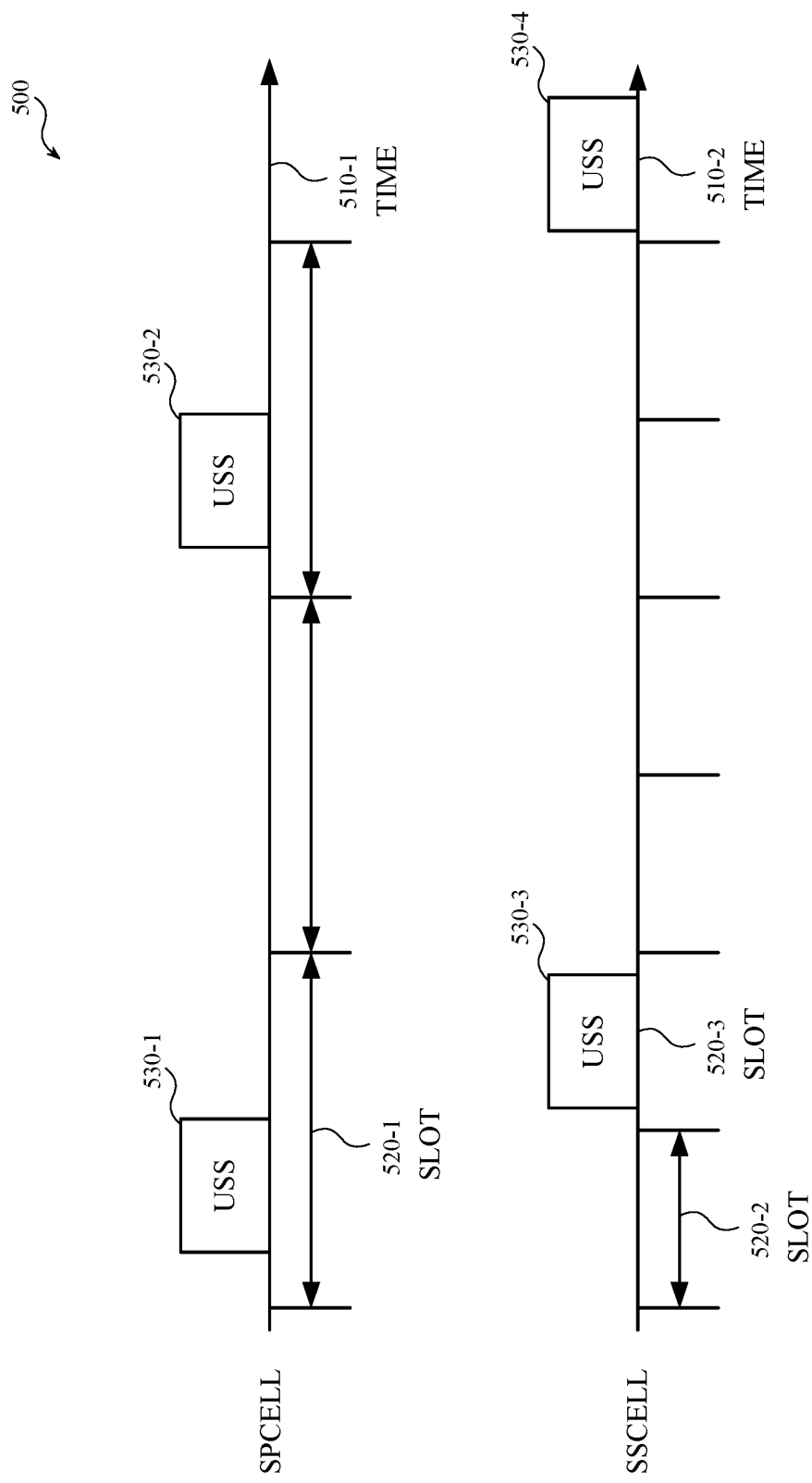

FIG. 5 is a diagram of an example 500 of slots for an SpCell and sSCell. As shown, timeline 510-1 of SpCell may include slots 520-1 with corresponding USS 530-1, 530-2, etc. Similarly, timeline 510-2 of sSCell may include slots 520-2, 520-3, etc., with corresponding USS 530-3, 530-4, etc. In some implementations, when CCS from sSCell to SpCell is configured, and UE 110 is configured to monitor USS with non-fallback DCI on both SpCell and sSCell, a base station (or other type of network device) may configure search spaces to ensure that in each slot. UE 110 is configured to monitor USS with non-fallback DCI on at most one of the SpCell or sSCell. Additionally, or alternatively, when the SpCell and sSCell have different subcarrier spacing (SCS), the base station or other type of network device may configure a duration of a monitoring occasion (e.g., a slot with a USS) to determine a slot overlapping between slots of the SpCell and sSCell.

Figure 6:
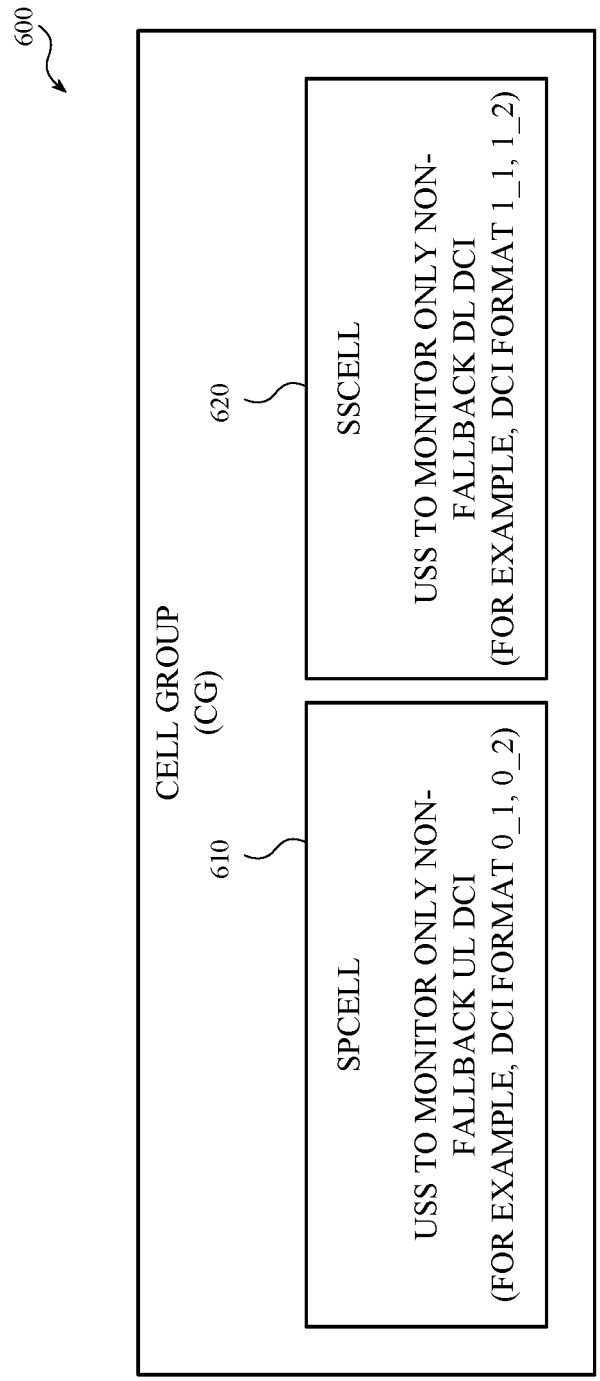
FIGS. 6 and 7 are diagrams of example configurations of cell groups (CGs).
Figure 7:
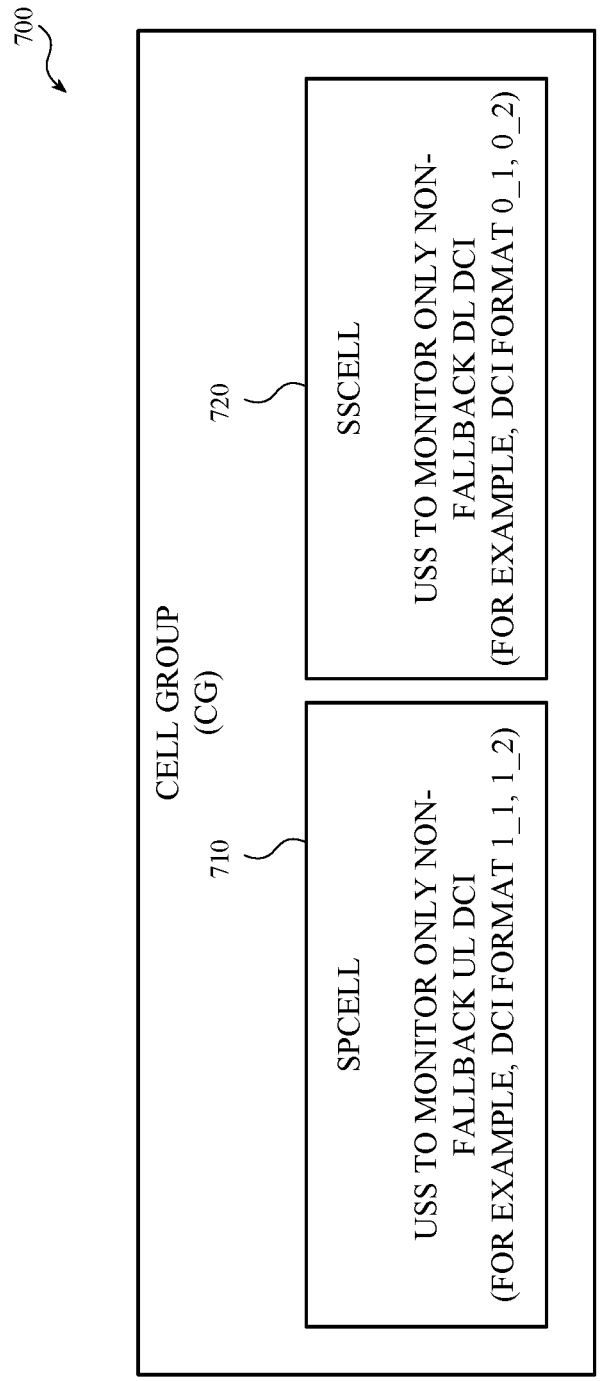

FIGS. 6 and 7 are diagram of example configurations of a cell groups (CG) 600 and 700. As shown, a CG 600 may include SpCell 610 and sSCell 620. SpCell 610 may be configured for USS regarding only non-fallback uplink (UL) DCI, which may correspond to certain DCI formats (e.g., DCI format 0_1, 0_2, etc.). sSCell 620 may be configured for USS regarding only non-fallback downlink (DL) DCI, which may correspond to certain DCI formats (e.g., DCI format 1_1, 1_2, etc.). By contrast, in other implementations, a CG 700 may include SpCell 710 and sSCell 720, where SpCell 710 may be configured for USS regarding only non-fallback DL DCI, which may correspond to certain DCI formats (e.g., DCI format 1_1, 1_2, etc.), and sSCell 720 may be configured for USS regarding only non-fallback UL DCI, which may correspond to certain DCI formats (e.g., DCI format 0_1, 0_2, etc.).

Figure 8:
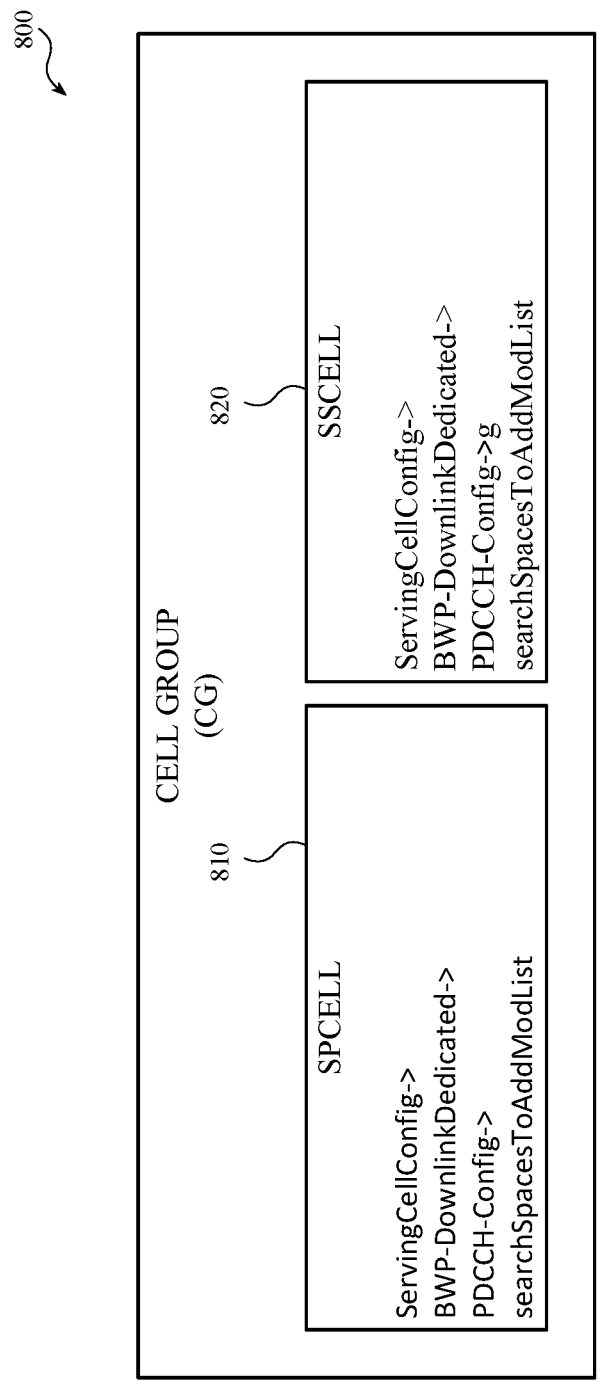
FIG. 8 is a diagram of an example configuration of a CG.

FIG. 8 is a diagram of an example configuration of a CG 800. As shown, a CG 800 may include SpCell 810 and sSCell 820 may each include one or more information fields or information elements. Examples of such fields or elements may include a serving cell configuration (ServingCellConfig) field, a DL bandwidth part (BWP) (BWP-DownlinkDedicated) field, a PDCCH configuration PDCCH-Config) field, and a search spaces to add mod list (searchSpacesToAddModList) field. In some implementations, when CCS from sSCell to SpCell is configured, a search space may be configured per DL BWP per cell search. In some implementations, when CCS from sSCell to SpCell is configured, a CCS configuration (e.g., CrossCarrierSchedulingConfig) information element for the SpCell may indicate whether the SpCell may be configured (e.g., by the sSCell), may indicate whether the SpCell has already been configured (e.g., by the sSCell), may indicate whether the SpCell can be configured to schedule any other cell, may include a carrier indicator field (CIF-presence) to indicate a grant or assignment for the cell, etc. In some implementations, a search space configuration (SearchSpace information element) of the SpCell may include configurable fields, which may indicate the PDCCH monitoring occasions for the SpCell as both the scheduling cell and the scheduled cell. In some implementations, the search space configuration may also include other fields, such as a nrofCandidates field, for the sSCell as the scheduling cell and for the SpCell as the scheduled cell.

Figure 9:
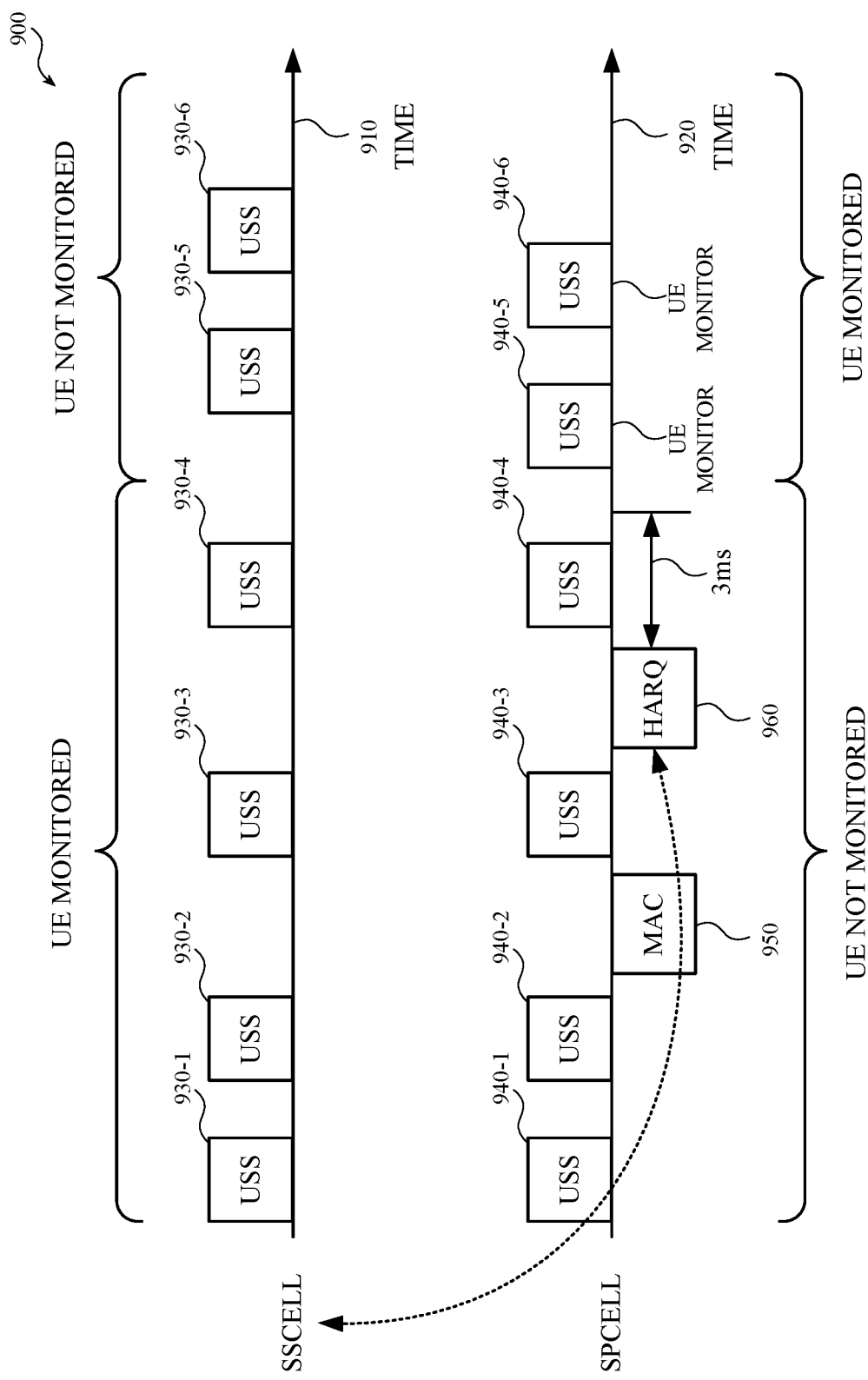
FIG. 9 is a diagram of an example of deactivating a sSCell.

FIG. 9 is a diagram of an example of deactivating a sSCell. As shown, a timeline 910 for the sSCell and a timeline 920 for the SpCell may include USS periods 930, and 940, respectively. UE 110 may monitor USS periods 930 of the sSCell without monitoring USS periods 940 of the SpCell. At some point, the sSCell may be deactivated, which may include a procedure that involves sending a media access control (MAC) control element (CE) 950 to UE 110 indicating that the sSCell is to be deactivated. In response, UE 110 may send a HARQ acknowledgement message 960 for the corresponding MAC CE and may switch from monitoring the USS 930 of the sSCell to monitoring the USS 940 of the SpCell after a specified period of time (e.g., 3 milliseconds) from sending the acknowledgement message.

Figure 10:
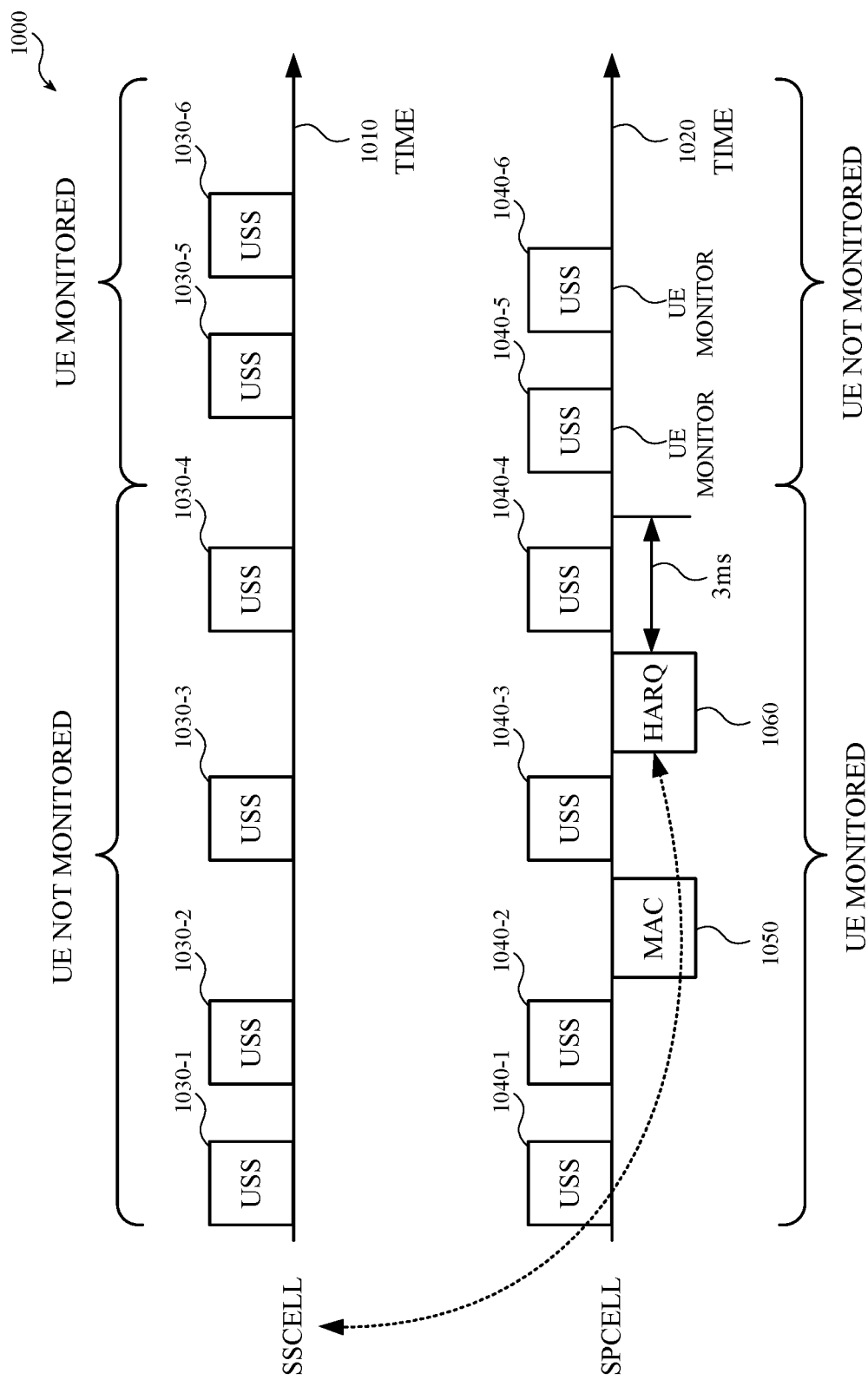
FIG. 10 is a diagram of an example of activating a sSCell.

FIG. 10 is a diagram of an example of activating a sSCell. As shown, a timeline 1010 for the sSCell and a timeline 1020 for the SpCell may include USS periods 1030, and 1040, respectively. UE 110 may monitor USS periods 1040 of the SpCell without monitoring USS periods 1030 of the SpCell. At some point, the sSCell may be activated, which may include a procedure that involves sending a MAC CE 1050 to UE 110 indicating that the sSCell is to be activated. In response, UE 110 may send a HARQ acknowledgement message 1060 for the corresponding MAC CE 1050 and may switch from monitoring the USS 1040 of the SpCell to monitoring the USS 1030 of the sSCell after a specified period of time (e.g., 3 milliseconds) from sending the acknowledgement message.

Figure 11:
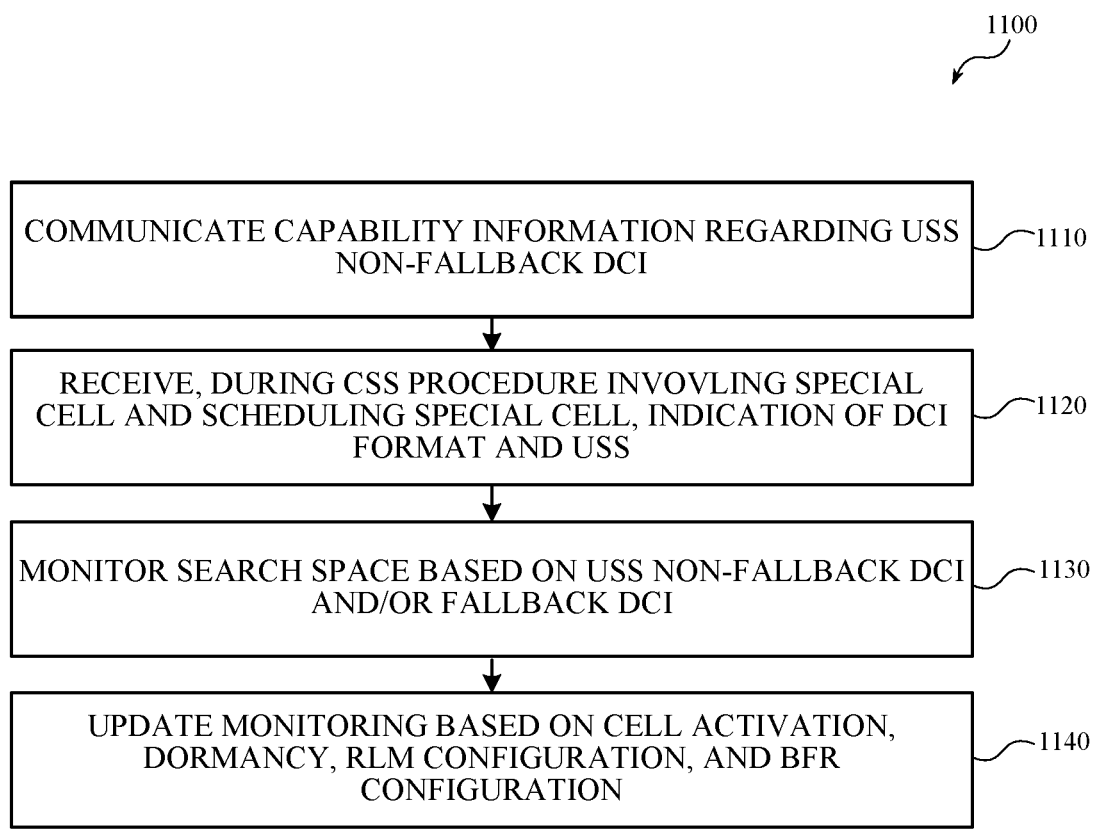
FIG. 11 is a diagram of an example process for monitoring search spaces for downlink control information (DCI).

FIG. 11 is a diagram of an example process 1100 for monitoring search spaces for downlink control information (DCI). Process 1100 may be implemented by UE 110, which may be in communication with an SpCell and/or sSCell (e.g., of either MCG 210 or SCG 220). In some implementations, some or all of process 1100 may be performed by one or more other systems or devices, including one or more of the devices of FIG. 1. Additionally, process 1100 may include one or more fewer, additional, differently ordered and/or arranged operations than those shown in FIG. 11. In some implementations, some or all of the operations of process 1100 may be performed independently, successively, simultaneously, etc., of one or more of the other operations of process 1100. As such, the techniques described herein are not limited to a number, sequence, arrangement, timing, etc., of the operations or process depicted in FIG. 11.

As shown, process 1100 may include communicating capability information regarding USS non-fallback DCI (block 1110). For example, UE 110 may indicate, to a base station, whether UE 110 is capable of receiving non-fallback DCI in a USS in either SpCell or sSCell. Additionally, or alternatively, UE 110 may indicate, to the base station, whether UE 110 is capable of receiving fallback DCI in a USS in either SpCell or sSCell.

Process 1100 may also include receiving information indicating a DCI format for receiving DCI and/or a corresponding USS for an SpCell and/or sSCell (block 1120). For example, UE 110 may receive, from the base station, an indication of a DCI format for the SpCell and/or sSCell. In some implementations, the information may indicate a USS for monitoring for non-fallback DCI. In some implementations, this information by received from the base station via another communication or procedure.

Process 1100 may include monitoring a search space for DCI information (block 1130). For example, UE 110 may monitor a USS for non-fallback DCI in accordance with a DCI format, and/or another type of information (e.g., specifying the SpCell and/or sSCell), received from the base station. In some implementation, UE 110 may also, or alternatively, monitor for fallback DCI (e.g., DCI transmitted at a standardized, pre-selected, default, or pre-specified time and place).

Process 1100 may also include updating monitoring based on cell activation, dormancy, RLM configurations, and/or BFR configuration (block 1140). For example, at some point, UE 110 may receive an indication (e.g., a MAC CE) from the base station of a change (e.g., activation or deactivation) of the SpCell and/or sSCell, and UE 110 may change the UE monitoring for DCI. For example, when sSCell is deactivated, UE 110 may switch from monitoring a USS of the sSCell to monitoring a USS of the SpCell. Similarly, when UE 110 receives an indication of an sSCell being activated, UE 110 may switch from monitoring the USS of the SpCell to monitoring the USS of the sSCell. Additionally, or alternatively, UE 110 may similarly update USS monitoring based on an indication that the SpCell and/or sSCell has entered into a dormant state of operation or an awake state of operation.

In some implementations, when RLM reference signal (e.g., a RadioLinkMonitoringRS element) is not configured, UE 110 may use a reference signal provided for a transmission configuration indicator state for PDCCH reception in the SpCell and/or sSCell. Additionally, when UE 110 uses the RS provided for the active TCI state for PDCCH reception in both SpCell and sSCell, if a total number of reference signals exceeds a reference signal capacity or threshold of UE 110, UE 110 may select a reference signal based on a pre-determined reference signal priority. In some implementations, UE 110 may first select the PDCCH of the SpCell instead of the sSCell. Additionally, or alternatively, UE 110 may select search space sets in an order from a shortest monitoring periodicity, and if more than one CORESETs are associated with search space sets having the same monitoring periodicity, UE 110 may determine an order of the CORESET from a highest CORESET index, which may, e.g., be indicated to UE 110 by the base station during the CCS procedure, via an RRC message, etc.

In some implementations, UE 110 may be configured to perform BFR based on the reference signals transmitted from instead of, or in addition to, for example, the reference signal transmitted from SpCell. In some implementations, UE 110 may be configured using a BeamFailureRecoverySCellConfig IE of the SCell. In some implementations, UE 110 may be configured to perform BFR based on a list or configuration of candidate beams or reference signals of the SpCell and/or the sSCell, which may include UE 110 receiving an index (e.g., a ServCellIndex) introduced in a particular IE, such as a PRACH-ResourceDedicatedBFR configuration IE. In some implementations, UE 110 may be configured to perform BFR on a SpCell based on one or more recovery spaces of BFRPs (Beam Failure Request resPonse) and/or recoverySearchSpaceIds for the SpCell, the sSCell, or both the SpCell and sSCell.

Figure 12:
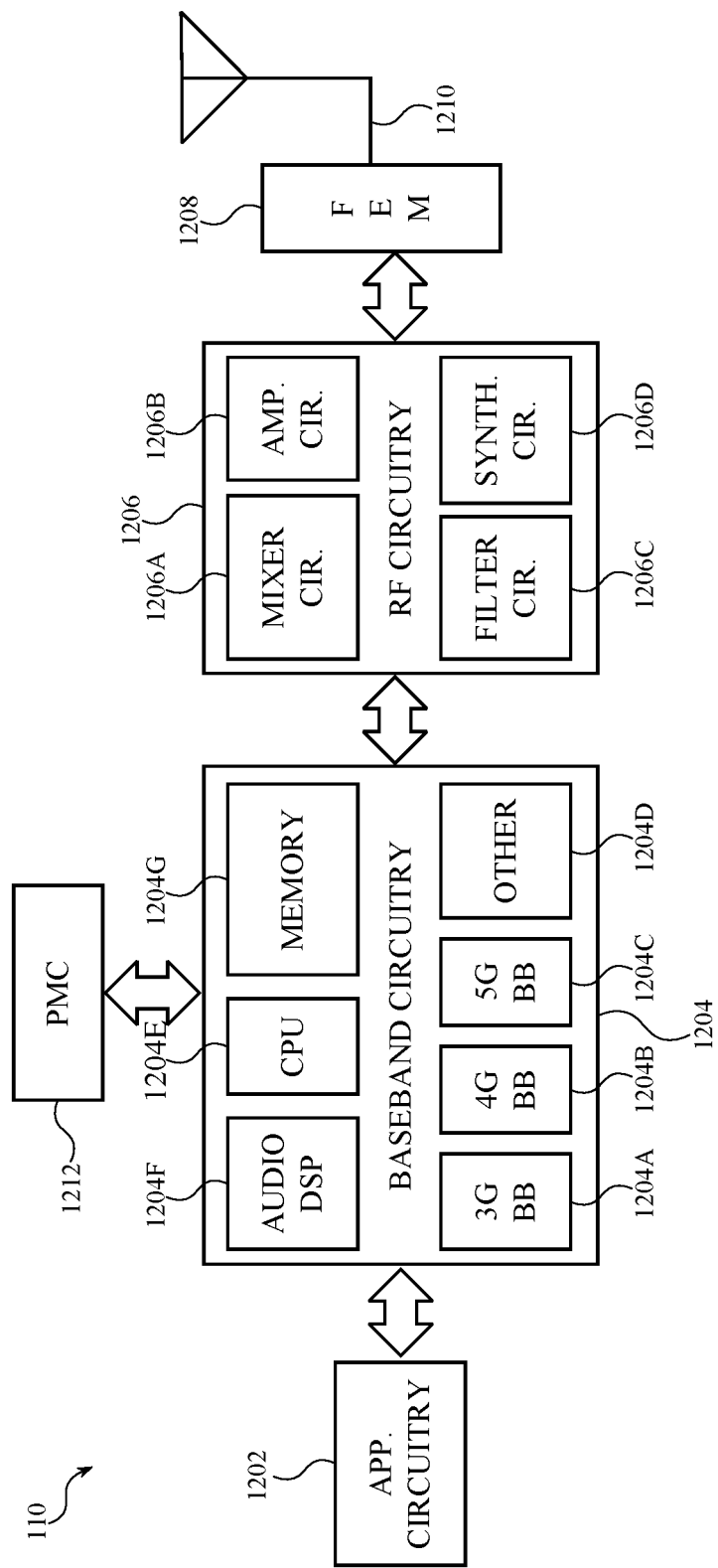
FIG. 12 is a diagram of an example of components of a device according to one or more implementations described herein.

FIG. 12 is a diagram of an example of components of a device according to one or more implementations described herein. In some implementations, the device 1200 can include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 can be included in a UE or a RAN node. In some implementations, the device 1200 can include fewer elements (e.g., a RAN node may not utilize application circuitry 1202, and instead include a processor/controller to process IP data received from a CN such as 5GC 130 or an Evolved Packet Core (EPC)). In some implementations, the device 1200 can include additional elements such as, for example, memory/storage, display, camera, sensor (including one or more temperature sensors, such as a single temperature sensor, a plurality of temperature sensors at different locations in device 1200, etc.), or input/output (I/O) interface. In other implementations, the components described below can be included in more than one device (e.g., said circuitries can be separately included in more than one device for Cloud-RAN (C-RAN) implementations).

The application circuitry 1202 can include one or more application processors. For example, the application circuitry 1202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1200. In some implementations, processors of application circuitry 1202 can process IP data packets received from an EPC.

The baseband circuitry 1204 can include circuitry such as, but not limited to, one or more single-core or multi-core processors. The baseband circuitry 1204 can include one or more baseband processors or control logic to process baseband signals received from a receive signal path of the RF circuitry 1206 and to generate baseband signals for a transmit signal path of the RF circuitry 1206. Baseband processing circuitry 1204 can interface with the application circuitry 1202 for generation and processing of the baseband signals and for controlling operations of the RF circuitry 1206. For example, in some implementations, the baseband circuitry 1204 can include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) can handle various radio control functions that enable communication with one or more radio networks via the RF circuitry 1206. In other implementations, some or all of the functionality of baseband processors 1204A-D can be included in modules stored in the memory 1204G and executed via a Central Processing Unit (CPU) 1204E. The radio control functions can include, but are not limited to, signal modulation/demodulation, encoding/decoding, radio frequency shifting, etc. In some implementations, modulation/demodulation circuitry of the baseband circuitry 1204 can include Fast-Fourier Transform (1-1-T), precoding, or constellation mapping/demapping functionality. In some implementations, encoding/decoding circuitry of the baseband circuitry 1204 can include convolution, tail-biting convolution, turbo, Viterbi, or Low Density Parity Check (LDPC) encoder/decoder functionality. Implementations of modulation/demodulation and encoder/decoder functionality are not limited to these examples and can include other suitable functionality in other implementations.

In some implementations, the baseband circuitry 1204 can include one or more audio digital signal processor(s) (DSP) 1204F. The audio DSP(s) 1204F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1204 and the application circuitry 1202 can be implemented together such as, for example, on a system on a chip (SOC).

In some implementations, the baseband circuitry 1204 can provide for communication compatible with one or more radio technologies. For example, in some implementations, the baseband circuitry 1204 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1204 is configured to support radio communications of more than one wireless protocol can be referred to as multi-mode baseband circuitry.

RF circuitry 1206 can enable communication with wireless networks using modulated electromagnetic radiation through a non-solid medium. In various implementations, the RF circuitry 1206 can include switches, filters, amplifiers, etc. to facilitate the communication with the wireless network. RF circuitry 1206 can include a receive signal path which can include circuitry to down-convert RF signals received from the FEM circuitry 1208 and provide baseband signals to the baseband circuitry 1204. RF circuitry 1206 can also include a transmit signal path which can include circuitry to up-convert baseband signals provided by the baseband circuitry 1204 and provide RF output signals to the FEM circuitry 1208 for transmission.

In some implementations, the receive signal path of the RF circuitry 1206 can include mixer circuitry 1206A, amplifier circuitry 1206B and filter circuitry 1206C. In some implementations, the transmit signal path of the RF circuitry 1206 can include filter circuitry 1206C and mixer circuitry 1206A. RF circuitry 1206 can also include synthesizer circuitry 1206d for synthesizing a frequency for use by the mixer circuitry 1206A of the receive signal path and the transmit signal path. In some implementations, the mixer circuitry 1206A of the receive signal path can be configured to down-convert RF signals received from the FEM circuitry 1208 based on the synthesized frequency provided by synthesizer circuitry 1206D. The amplifier circuitry 1206B can be configured to amplify the down-converted signals and the filter circuitry 1206C can be a low-pass filter (LPF) or band-pass filter (BPF) configured to remove unwanted signals from the down-converted signals to generate output baseband signals. Output baseband signals can be provided to the baseband circuitry 1204 for further processing. In some implementations, the output baseband signals can be zero-frequency baseband signals, although this is not a requirement. In some implementations, mixer circuitry 1206A of the receive signal path can comprise passive mixers, although the scope of the implementations is not limited in this respect.

In some implementations, the mixer circuitry 1206A of the transmit signal path can be configured to up-convert input baseband signals based on the synthesized frequency provided by the synthesizer circuitry 1206D to generate RF output signals for the FEM circuitry 1208. The baseband signals can be provided by the baseband circuitry 1204 and can be filtered by filter circuitry 1206c.

In some implementations, the mixer circuitry 1206A of the receive signal path and the mixer circuitry 1206A of the transmit signal path can include two or more mixers and can be arranged for quadrature downconversion and upconversion, respectively. In some implementations, the mixer circuitry 1206A of the receive signal path and the mixer circuitry 1206A of the transmit signal path can include two or more mixers and can be arranged for image rejection (e.g., Hartley image rejection). In some implementations, the mixer circuitry 1206A of the receive signal path and the mixer circuitry'1206A can be arranged for direct downconversion and direct upconversion, respectively. In some implementations, the mixer circuitry 1206A of the receive signal path and the mixer circuitry 1206A of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 1206 can include analog-to-digital converter (ADC) and digital-to-analog converter (DAC) circuitry and the baseband circuitry 1204 can include a digital baseband interface to communicate with the RF circuitry 1206.

In some dual-mode implementations, a separate radio IC circuitry can be provided for processing signals for each spectrum, although the scope of the implementations is not limited in this respect.

In some implementations, the synthesizer circuitry 1206d can be a fractional-N synthesizer or a fractional N/N+1 synthesizer, although the scope of the implementations is not limited in this respect as other types of frequency synthesizers can be suitable. For example, synthesizer circuitry 1206d can be a delta-sigma synthesizer, a frequency multiplier, or a synthesizer comprising a phase-locked loop with a frequency divider.

The synthesizer circuitry 1206d can be configured to synthesize an output frequency for use by the mixer circuitry 1206A of the RF circuitry 1206 based on a frequency input and a divider control input. In some implementations, the synthesizer circuitry 1206d can be a fractional N/N+1 synthesizer.

In some implementations, frequency input can be provided by a voltage controlled oscillator (VCO), although that is not a requirement. Divider control input can be provided by either the baseband circuitry 1204 or the applications processor 1202 depending on the desired output frequency. In some implementations, a divider control input (e.g., N) can be determined from a look-up table based on a channel indicated by the applications processor 1202.

Synthesizer circuitry 1206d of the RF circuitry 1206 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1206d can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1206 can include an IQ/polar converter.

FEM circuitry 1208 can include a receive signal path which can include circuitry configured to operate on RF signals received from one or more antennas 1210, amplify the received signals and provide the amplified versions of the received signals to the RF circuitry 1206 for further processing. FEM circuitry 1208 can also include a transmit signal path which can include circuitry configured to amplify signals for transmission provided by the RF circuitry 1206 for transmission by one or more of the one or more antennas 1210. In various implementations, the amplification through the transmit or receive signal paths can be done solely in the RF circuitry 1206, solely in the FEM 1208, or in both the RF circuitry 1206 and the FEM 1208.

In some implementations, the FEM circuitry 1208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1206). The transmit signal path of the FEM circuitry 1208 can include a power amplifier (PA) to amplify input RF signals (e.g., provided by RF circuitry 1206), and one or more filters to generate RF signals for subsequent transmission (e.g., by one or more of the one or more antennas 1210).

In some implementations, the PMC 1212 can manage power provided to the baseband circuitry 1204. In particular, the PMC 1212 can control power-source selection, voltage scaling, battery charging, or DC-to-DC conversion. The PMC 1212 can often be included when the device 1200 is capable of being powered by a battery, for example, when the device is included in a UE. The PMC 1212 can increase the power conversion efficiency while providing desirable implementation size and heat dissipation characteristics.

While FIG. 12 shows the PMC 1212 coupled only with the baseband circuitry 1204. However, in other implementations, the PMC 1212 may be additionally or alternatively coupled with, and perform similar power management operations for, other components such as, but not limited to, application circuitry 1202, RF circuitry 1206, or FEM 1208.

In some implementations, the PMC 1212 can control, or otherwise be part of, various power saving mechanisms of the device 1200. For example, if the device 1200 is in an RRC_Connected state, where it is still connected to the RAN node as it expects to receive traffic shortly, then it can enter a state known as Discontinuous Reception Mode (DRX) after a period of inactivity. During this state, the device 1200 can power down for brief intervals of time and thus save power.

If there is no data traffic activity for an extended period of time, then the device 1200 can transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1202 and processors of the baseband circuitry 1204 can be used to execute elements of one or more instances of a protocol stack. For example, processors of the baseband circuitry 1204, alone or in combination, can be used execute Layer 3, Layer 2, or Layer 1 functionality, while processors of the application circuitry 1204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 13:
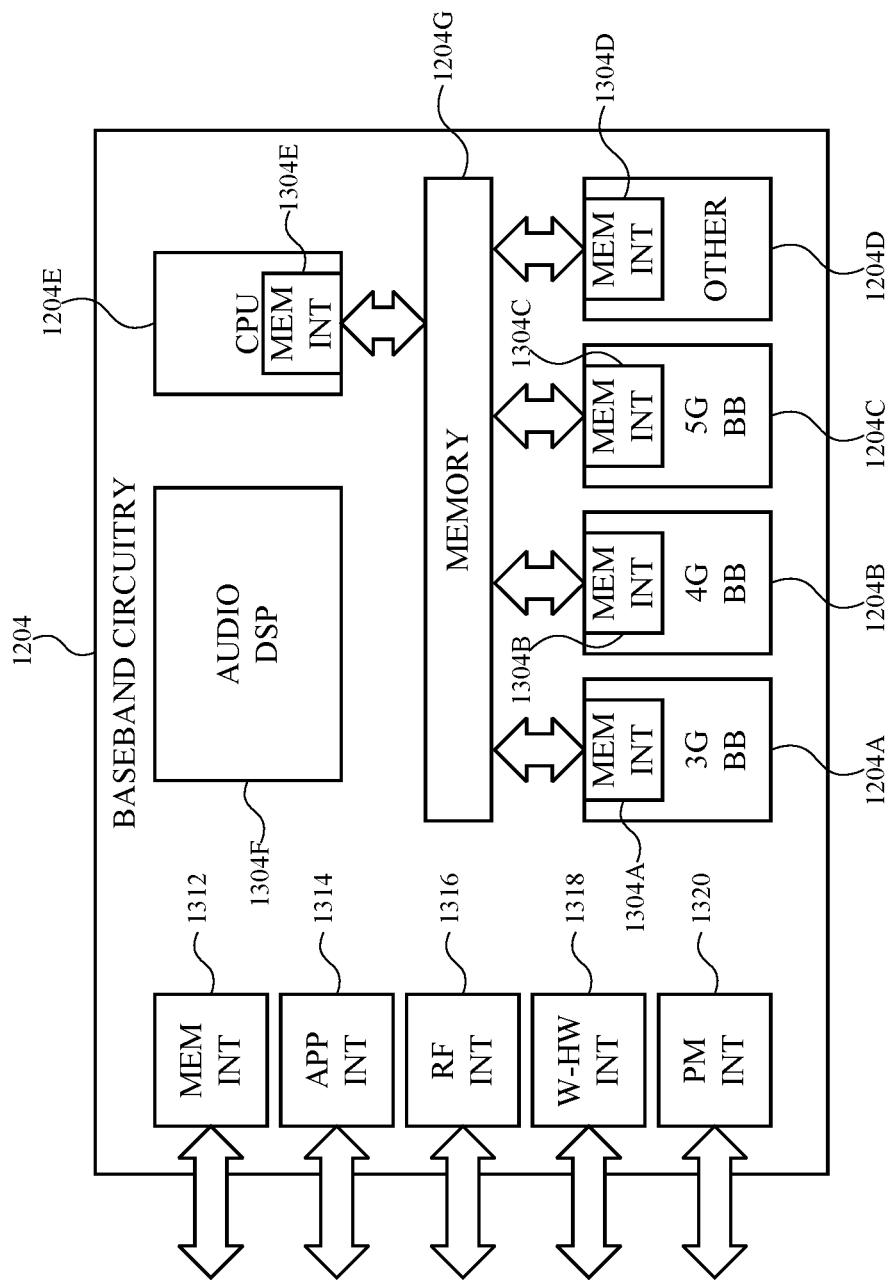
FIG. 13 is a diagram of example interfaces of baseband circuitry according to one or more implementations described herein.

FIG. 13 is a diagram of example interfaces of baseband circuitry according to one or more implementations described herein. As discussed above, the baseband circuitry 1204 of FIG. 12 can comprise processors 1204A-1204E and a memory 1204G utilized by said processors. Each of the processors 1204A-1204E can include a memory interface, 1304A-1304E, respectively, to send/receive data to/from the memory 1204G.

The baseband circuitry 1204 can further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC '1212).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, a baseband processor of a base station may comprise one or more processors configured to: receive, from a user equipment (UE), capability information indicating which cell can be configured to schedule non-fallback downlink control information (DCI) in a UE-specific search space (USS) for special cell (SpCell) scheduling; determine, based on the capability information, a DCI format and USS for communicating non-fallback DCI to the UE; indicate, during cross carrier scheduling (CCS) involving the (SpCell) and a scheduling special cell (sSCell), the DCI format and the USS to the UE; and cause the non-fallback DCI to be communicated to the UE in accordance with the DCI format and the USS.

In example 2, when the UE supports USS with non-fallback DCI in both the SpCell and the sSCell, both the SpCell and the sSCell are configured to communicate the non-fallback DCI in the USS, and when the UE does not support USS with non-fallback DCI in both SpCell and sSCell, only the sSCell is configured to communicate the non-fallback DCI in the USS. In example 3, the capability information further indicates whether the UE supports monitoring, in a same slot, the USS with non-fallback DCI from the SpCell and the sSCell, when the UE supports the monitoring of the SpCell and the sSCell, in the same slot, both the SpCell and the sSCell are configured to communicate the non-fallback DCI, and when the UE does not support the monitoring of the SpCell and the sSCell, in the same slot, only one of the SpCell and the sSCell is configured to communicate the non-fallback DCI.

In example 4, when the UE supports the monitoring of the SpCell and the sSCell, and both the SpCell and the sSCell are configured to communicate the non-fallback DCI, the USS is configured to cause the UE to monitor for the non-fallback DCI by alternating between slots of the SpCell or the sSCell. In example 5, when the SpCell and sSCell have different subcarrier spacing (SCS), slot overlap, between slots of the SpCell and the sSCell, is determined based on a duration of a monitoring occasion of the USS. In example 6, when the SpCell and sSCell have different subcarrier spacing (SCS), slot overlap, between slots of the SpCell and the sSCell, is determined based on slots including monitoring occasions of the USS.

In example 7, when the UE supports the monitoring of the SpCell and the sSCell, and both the SpCell and the sSCell are configured to communicate the non-fallback DCI, the USS is configured so that the SpCell is only associated with downlink (DL) DCI and the sSCell is only associated with an uplink (UL) DCI, or the USS is configured so that the SpCell is only associated with the UL DCI and the sSCell is only associated with the DL DCI. In example 8, the one or more processors is further configured to: activate USS with non-fallback DCI monitoring for at least one of the SpCell or the sSCell, and deactivate the USS with non-fallback DCI monitoring for at least one of the SpCell or the sSCell. In example 9, activation of the USS with non-fallback DCI monitoring on one cell automatically deactivates the USS with non-fallback DCI monitoring active on any other cells. In example 10, activation or deactivation of the USS with non-fallback DCI monitoring for the SpCell or the sSCell involves a communication, regarding the activation or deactivation, to be communicated to the UE, the communication comprising at least one of: a radio resource control (RRC) message; a media access control (MAC) control element (CE); or DCI.

In example 11, the one or more processors is further configured to: receive, from a user equipment (UE), capability information indicating whether the UE supports USS with fallback DCI. In example 12, the SpCell is configured to communicate the fallback DCI but not the sSCell. In example 13, when both the SpCell and the sSCell are configured to communicate the fallback DCI, the UE is configured to monitor only one of the SpCell or the sSCell. In example 14, when both the SpCell and the sSCell are configured to communicate the fallback DCI, the SpCell is configured to communicate downlink (DL) DCI and the sSCell is configured to communicate uplink (UL) DCI, or the SpCell is configured to communicate the UL DCI and the sSCell is configured to communicate DL DCI.

In example 15, when only one of the SpCell or the sSCell is activated to communicate fallback DCI to the UE, a communication regarding the activation, is communicated to the UE, via at least one of: a radio resource control (RRC) message; a media access control (MAC) control element (CE); or DCI. In example 16, the USS is configured to indicate fallback DCI being from the sSCell or the SpCell. In example 17, a physical downlink control channel (PDCCH) of the USS is configured to indicate fallback DCI being from the sSCell or the SpCell. In example 18, the CCS of the sSCell and SpCell includes a CCS information element IE configured by the network to the UE. In example 19, when CCS of the sSCell to the SpCell is performed, the USS is configured on a per-DL bandwidth part (BWP) basis for each scheduling cell.

In example 20, when CCS of the sSCell to the SpCell is performed, the USS of the SpCell, the sSCell, or each of the SpCell and sSCell is configured with an information element (IE) indicating a PDCCH monitoring occasion for the USS. In example 21, the one or more processors is further configured to: cause the SpCell or the sSCell to enter a dormant state from an active state and cause the SpCell or the sSCell to enter an active state from a dormant state. In example 22, the one or more processors is further configured to: prior to causing the sSCell to enter the dormant state, verify at least one of: dormancy of the sSCell is permitted; the non-fallback DCI is configured on at least the SpCell; or DCI format 2_6 is not configured on the sSCell only. In example 23, radio link monitoring (RLM) is configured, via radio resource control (RRC), in at least one of the SpCell or sSCell.

In example 24, radio link monitoring (RLM) reference signals are not configured in the SpCell or sSCell, reference signals (RS) is provided to be used by the UE, for active transmission configuration indicators (TCIs) for PDCCH reception in at least one of the SpCell or sSCell are used for RLM. In example 25, when the number of RS of active TCIs exceeds a capability of the UE, the UE selects RSs based on the following order: 1) selecting RSs of the PDCCH of the SpCell before RSs of the PDCCHs of the sSCell; 2) selecting search space sets in an order from a shortest monitoring periodicity to longer monitoring periodicity; 3) selecting search spaces with higher CORESET indexes before search spaces with lower CORESET indexes.

In example 26, when the sSCell configures the SpCell for beam failure recovery (BFR) during the CCS, and configuration of the SpCell for BFR includes a reference signal (RS) for BFR in at least one of the SpCell, the sSCell, or both the SpCell and sSCell. In example 27, when the sSCell configures the SpCell for beam failure recovery (BFR) during the CCS, and configuration of the SpCell for BFR includes indicating a recovery search space identifier for BFR in at least one of the SpCell, the sSCell, or both the SpCell and sSCell. In example 28, when the sSCell configures the SpCell for beam failure recovery (BFR) during the CCS, and configuration of the SpCell for BFR includes indicating an additional search space identifier for BFR in at least one of the SpCell, the sSCell, or both the SpCell and sSCell. In example 29, when the sSCell configures the SpCell during the CSS, the sSCell and SpCell are configured as being part of a same cell group. In example 30, bandwidth part (BWP) switching on the SpCell is triggered by at least one of: the DCI scheduled in the sSCell, or the DCI scheduled in the SpCell.

In example 31, a baseband processor of a User Equipment (UE) may comprise: one or more processors configured to: communicate, to a base station, capability information indicating which cell can be configured to schedule non-fallback downlink control information (DCI) in a UE-specific search space (USS) for special cell (SpCell) scheduling; receive, based on the capability information and during a cross carrier scheduling (CCS) procedure involving a special cell (SpCell) and a scheduling special cell (sSCell), a downlink control information (DCI) format and the USS; and monitor, based on the DCI format, the USS for the non-fallback DCI.

In example 32, the one or more processors are configured to monitor for the non-fallback DCI on both the SpCell and the sSCell simultaneously. In example 33, the one or more processors are configured to monitor for fallback DCI on the SpCell when non-fallback DCI is only configured on the sSCell and the sSCell is deactivated or put to dormant. In example 34, the one or more processors are configured to monitor for the non-fallback DCI on the sSCell when non-fallback DCI is configured on both the sSCell and the sSCell, and the sSCell is active. In example 35, the one or more processors are configured to: detect activation or deactivation of the sSCell; when the sSCell is activated, begin monitoring the USS of the sSCell after a predetermine interval measured from acknowledging the activation of the sSCell; when the sSCell is deactivated, stop monitoring the USS of the SpCell after the predetermine interval measured from acknowledging the activation of the sSCell.

In example 36, a base station substantially as shown and described herein. In example 37, a computer-readable medium, of a base station, substantially as shown and described. In example 38, a method, performed by a base station, substantially as shown and described. In example 39, a User Equipment (UE) substantially as shown and described. In example 40, a computer-readable medium, of a User Equipment (UE), substantially as shown and described. In example 41, a method, performed by a User Equipment (UE), substantially as shown and described.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor of a base station, comprising: one or
more processors configured to:
receive user equipment (UE) capability information indicating which cell is configurable to schedule non-fallback downlink control information (DCI) in a UE specific search space (USS) for scheduling of a special cell (SpCell);
determine, based on the UE capability information, a DCI format and the USS for communicating the non-fallback DCI;
indicate, during cross carrier scheduling (CCS) involving the SpCell and a scheduling special cell (sSCell), the DCI format and the USS; and
cause the non-fallback DCI to be communicated in accordance with the DCI format and the USS, wherein:
the UE capability information further indicates whether the UE supports monitoring, in a same slot, the USS with the non-fallback DCI from the SpCell and the sSCell,
when the UE supports the monitoring of the SpCell and the sSCell, in the same slot, both the SpCell and the sSCell are configured to communicate the non-fallback DCI, and
when the UE does not support the monitoring of the SpCell and the sSCell, in the same slot, only one of the SpCell or the sSCell is configured to communicate the non fallback DCI.

2. The baseband processor of claim 1, wherein:
when the UE supports the USS with the non-fallback DCI in both the SpCell and the sSCell, both the SpCell and the sSCell are configured to communicate the non-fallback DCI in the USS, and
when the UE does not support the USS with the non-fallback DCI in both the SpCell and the sSCell, only the sSCell is configured to communicate the non-fallback DCI in the USS.

3. The baseband processor of claim 1, wherein, when the SpCell and the sSCell have different subcarrier spacing (SCS), slot overlap, between slots of the SpCell and the sSCell, is determined based on a duration of a monitoring occasion of the USS.

4. The baseband processor of claim 1, wherein, when the SpCell and the sSCell have different subcarrier spacing (SCS), slot overlap, between slots of the SpCell and the sSCell, is determined based on slots including monitoring occasions of the USS.

5. The baseband processor of claim 1, wherein, the one or more processors is further configured to:
activate the USS with non-fallback DCI monitoring for at least one of the SpCell or the sSCell, and
deactivate the USS with the non-fallback DCI monitoring for at least one of the SpCell or the sSCell,
wherein activation of the USS with the non-fallback DCI monitoring on one cell deactivates the USS with the non-fallback DCI monitoring active on any other cells.

6. The baseband processor of claim 1, wherein activation or deactivation of the USS with non-fallback DCI monitoring for the SpCell or the sSCell involves a communication, regarding the activation or the deactivation, to be communicated to the UE, the communication comprising at least one of:
- a radio resource control (RRC) message;
- a media access control (MAC) control element (CE); or
- DCI.

7. The baseband processor of claim 1, wherein, when the CCS of the sSCell to the SpCell is performed, the USS is configured on a per-DL bandwidth part (BWP) basis for each scheduling cell.

8. The baseband processor of claim 1, wherein, when the CCS of the sSCell to the SpCell is performed, the USS of the SpCell, the sSCell, or each of the SpCell and the sSCell is configured with an information element (IE) indicating a PDCCH monitoring occasion for the USS.

9. The baseband processor of claim 1, wherein the one or more processors is further configured to:
- cause the SpCell or the sSCell to enter a dormant state from an active state,
- cause the SpCell or the sSCell to enter an active state from a dormant state; and
- prior to causing the sSCell to enter the dormant state, verify at least one of:
  - dormancy of the sSCell is permitted;
  - the non-fallback DCI is configured on at least the SpCell; or
  - DCI format 2_6 is not configured on the sSCell only.

10. The baseband processor of claim 1, wherein when radio link monitoring (RLM) reference signals are not configured in the SpCell or the sSCell, a reference signal (RS) is provided, for active transmission configuration indicators (TCIs) for PDCCH reception in at least one of the SpCell or the sSCell for RLM.

11. The baseband processor of claim 1, wherein, when the sSCell configures the SpCell for beam failure recovery (BFR) during the CCS, a configuration of the SpCell for the BFR includes indicating a reference signal (RS), a recovery search space identifier, or an additional search space identifier, in at least one of the SpCell, the sSCell, or both the SpCell and the sSCell.

12. The baseband processor of claim 1, wherein, when the sSCell configures the SpCell during the CCS, the sSCell and the SpCell are configured as being part of a same cell group.

13. A baseband processor of a base station, comprising:
one or more processors configured to:
- receive user equipment (UE) capability information indicating which cell is configurable to schedule non-fallback downlink control information (DCI) in a UE-specific search space (USS) for scheduling of a special cell (SpCell);
- determine, based on the UE capability information, a DCI format and the USS for communicating the non-fallback DCI;
- indicate, during cross carrier scheduling (CCS) involving the SpCell and a scheduling special cell (sSCell), the DCI format and the USS; and
- cause the non-fallback DCI to be communicated in accordance with the DCI format and the USS, wherein, when the UE supports monitoring of the SpCell and the sSCell, and both the SpCell and the sSCell are configured to communicate the non-fallback DCI, the USS is configured to cause the UE to monitor for the non-fallback DCI by alternating between slots of the SpCell or the sSCell.

14. The baseband processor of claim 13, wherein, when the SpCell and the sSCell have different subcarrier spacing (SCS), slot overlap, between slots of the SpCell and the sSCell, is determined based on a duration of a monitoring occasion of the USS.

15. The baseband processor of claim 13, wherein, when the SpCell and the sSCell have different subcarrier spacing (SCS), slot overlap, between slots of the SpCell and the sSCell, is determined based on slots including monitoring occasions of the USS.

16. The baseband processor of claim 13, wherein activation or deactivation of the USS with non-fallback DCI monitoring for the SpCell or the sSCell involves a communication, regarding the activation or the deactivation, to be communicated to the UE, the communication comprising at least one of:
- a radio resource control (RRC) message;
- a media access control (MAC) control element (CE); or
- DCI.

17. A baseband processor of a base station, comprising:
one or more processors configured to:
- receive user equipment (UE) capability information indicating which cell is configurable to schedule non-fallback downlink control information (DCI) in a UE-specific search space (USS) for scheduling of a special cell (SpCell);
- determine, based on the UE capability information, a DCI format and the USS for communicating the non-fallback DCI;
- indicate, during cross carrier scheduling (CCS) involving the SpCell and a scheduling special cell (sSCell), the DCI format and the USS; and
- cause the non-fallback DCI to be communicated in accordance with the DCI format and the USS, wherein the UE capability information indicates whether the UE supports the USS with fallback DCI, wherein a physical downlink control channel (PDCCH) of the USS is configured to indicate the fallback DCI being from the sSCell or the SpCell, and wherein the SpCell is configured to communicate the fallback DCI, but not the sSCell, or both the SpCell and the sSCell are configured to communicate the fallback DCI,
wherein when both the SpCell and the sSCell are configured to communicate the fallback DCI:
- the SpCell is configured to communicate downlink (DL) DCI and the sSCell is configured to communicate uplink (UL) DCI, or
- the SpCell is configured to communicate the UL DCI and the sSCell is configured to communicate the DL DCI.

18. The baseband processor of claim 17, wherein the one or more processors is further configured to:
- cause the SpCell or the sSCell to enter a dormant state from an active state,
- cause the SpCell or the sSCell to enter an active state from a dormant state; and
- prior to causing the sSCell to enter the dormant state, verify at least one of:
  - dormancy of the sSCell is permitted;
  - the non-fallback DCI is configured on at least the SpCell; or
  - DCI format 2_6 is not configured on the sSCell only.

19. The baseband processor of claim 17, wherein when radio link monitoring (RLM) reference signals are not configured in the SpCell or the sSCell, a reference signal (RS) is provided, for active transmission configuration indicators (TCIs) for PDCCH reception in at least one of the SpCell or the sSCell for RLM.

20. The baseband processor of claim 17, wherein, when the sSCell configures the SpCell for beam failure recovery (BFR) during the CCS, a configuration of the SpCell for the BFR includes indicating a reference signal (RS), a recovery search space identifier, or an additional search space identifier, in at least one of the SpCell, the sSCell, or both the SpCell and the sSCell.

* * * * *